(12) United States Patent
DeSimone et al.

(10) Patent No.: US 6,288,202 B1
(45) Date of Patent: Sep. 11, 2001

(54) SYNTHESIS OF POLYCARBONATES USING $CO_2$

(75) Inventors: Joseph M. DeSimone, Chapel Hill; Ramone Givens, Durham, both of NC (US); Mitsutoshi Jikei, Tokyo (JP); Jeffrey D. Cohen, Kennett Square, PA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 08/827,755

(22) Filed: Apr. 11, 1997

(51) Int. Cl.[7] .................................................. C08G 64/00
(52) U.S. Cl. .......................................... 528/196; 528/198
(58) Field of Search ..................................... 528/196, 198

(56) References Cited

U.S. PATENT DOCUMENTS

| 3,294,772 | 12/1966 | Cottle . |
| 3,522,228 | 7/1970 | Fukui et al. . |

(List continued on next page.)

FOREIGN PATENT DOCUMENTS

| 3537455A1 | 4/1987 | (DE) . |
| 0 300 981 A1 | 1/1989 | (EP) . |
| 0356815 | 3/1990 | (EP) ............................... C08G/63/88 |
| 0356815 A3 | 3/1990 | (EP) ............................... C08G/63/88 |
| 0 222 714 B1 | 3/1992 | (EP) . |
| 0 269 583 B1 | 6/1993 | (EP) . |
| 1172713 | 5/1967 | (GB) . |
| 3177407 | 8/1991 | (JP) . |
| WO 90/07536 | 7/1990 | (WO) . |
| WO 96/39456 | 12/1996 | (WO) ............................... C08G/63/16 |

OTHER PUBLICATIONS

E. Beckman et al.; Crystallization of Bisphenol a Polycarbonate Induced by Supercritical Carbon Dioxide, *J. of Polymer Science: Part B: Polymer Physics* 25:1511–1517 (1987).

Garg et al, "Thermodynamics of Polymer Melts Swollen With Supercritical Gases", *Macromolecules*, 1994, vol. 27, pp. 5643–5653.

(List continued on next page.)

*Primary Examiner*—Terressa Mosley-Boykin
(74) *Attorney, Agent, or Firm*—Myers Bigel Sibley & Sajovec, P.A.

(57) ABSTRACT

A process of forming a polycarbonate comprises providing a reaction mixture of at least one polycarbonate-forming monomer and carbon dioxide; and then reacting the polycarbonate-forming monomer and carbon dioxide in the reaction mixture to form the polycarbonate. In one embodiment, the polycarbonate is present in a condensate, and the process further comprises removing carbon dioxide from the reaction mixture; and then collecting the condensate from the reaction mixture. Moreover, uncrystallized polycarbonate may be treated with carbon dioxide to form crystalline polycarbonate. The crystalline polycarbonate is then rendered useful for solid state polymerization.

12 Claims, 5 Drawing Sheets

U.S. PATENT DOCUMENTS

| | | | |
|---|---|---|---|
| 3,668,139 | 6/1972 | Daniels et al. | 252/186 |
| 3,689,462 | 9/1972 | Maximovich et al. | 260/77.5 D |
| 3,891,605 | 6/1975 | Larsen et al. | 260/75 H |
| 4,238,593 | 12/1980 | Duh | 528/272 |
| 4,452,968 * | 6/1984 | Bolon et al. | 528/271 |
| 4,748,220 | 5/1988 | Hartmann et al. | 526/89 |
| 4,754,017 | 6/1988 | Leitz et al. | 528/371 |
| 4,764,323 | 8/1988 | Al-Ghatta | 264/85 |
| 4,791,929 | 12/1988 | Jarrett et al. | 128/335.5 |
| 4,920,203 | 4/1990 | Tang et al. | 525/409 |
| 4,990,595 | 2/1991 | Traechkner et al. | 528/483 |
| 5,015,724 | 5/1991 | Kawabe | 528/272 |
| 5,049,647 | 9/1991 | Al-Ghatta | 528/272 |
| 5,073,203 | 12/1991 | Al-Ghatta | 134/11 |
| 5,256,764 | 10/1993 | Tang et al. | 528/370 |
| 5,312,882 | 5/1994 | DeSimone et al. | 526/201 |
| 5,382,623 | 1/1995 | DeSimone et al. | 524/557 |
| 5,412,068 | 5/1995 | Tang et al. | 528/370 |
| 5,434,239 | 7/1995 | Bhatia | 528/274 |
| 5,478,910 | 12/1995 | Russell et al. | 528/274 |
| 5,506,331 | 4/1996 | Nagao et al. | 528/193 |
| 5,625,027 * | 4/1997 | Kuze et al. | 528/196 |
| 5,698,665 | 12/1997 | Odell | 528/480 |
| 5,710,238 * | 1/1998 | Sivaram et al. | 528/196 |

OTHER PUBLICATIONS

Condo et al., "Glass Transitions of Polymers with Compressed Fluid Diluents: Type II and III Behavior", *Macromolecules*, 1994, vol. 27, pp. 365–371.

Iyer, V.S., et al., "Solid–State polymerization of Poly(aryl carbonate)s: A Facile Route to High Molecular Weight Polycarbonates", *Macromolecules*, 1993, vol. 26, pp. 1186–1187.

Radhakrishnan, S., et al., "Structure and Morphology of Polycarbonate Synthesized by Solid State Polycondensation", *Polymer*, 1994, vol. 35, pp. 3789–3791.

Beckman, et al., "Copolymerization of 1,2–Epoxycyclohexane and Carbon Dioxide Using Carbon Dioxide as Both Reactant and Solvent", *Macromolecules*, 1997, vol. 20, No. 3, pp. 368–372.

Shuichi Oi, et al., "Direct synthesis of polycarbonates from $CO_2$, diols, and dihalides", *Macromolecular: Rapid Communications*, Feb. 1994, vol. 15, No. 2, pp. 133–137.

DeSimone et al., Dispersion Polymerizations In Supercritical Carbon Dioxide, Science, 265:356–359 (Jul. 15, 1994).

H. Mark et al., Polyesters, The Encyclopedia of Polymer Science and Engineering, Eds., 2d ed., 12:1–60 (1985).

M. McHugh et al., Supercritical Fluid Chromatography Analysis Of Polystyrene, Excerpts from Supercritical Fluid Extraction, EDS., pp. 147–159 (1986).

Shaffer et al., Chain Polymerizations In Inert Near– and Supercritical Fluids, TRIP 3, No. 5:146–153, (May 1995).

Varadarajan, Free Radical Polymerization In Supercritical Fluid Solvents, Doctoral Thesis Digest, pp. 2–34, Nov. 29, 1990.

Scholsky, Supercritical Polymerication Reactions, pp. 685–686.

V. Krukonis et al., Supercritical Fluid Chromatography Analysis of Polystyrene, Polymer Fractionation, pp. 146–147, 156–159, 244–245, 248–249.

* cited by examiner

SYNTHESIS OF POLYCARBONATES USING CO₂

CROSS-REFERENCE TO RELATED APPLICATIONS

The instant application is a Continued Prosecution Application of co-pending application Ser. No. 08/827,755, filed Apr. 11, 1997 and incorporated herein by reference in its entirety.

FIELD OF THE INVENTION

The invention relates to a process of forming polycarbonates using carbon dioxide both as a reactant and a reaction medium.

BACKGROUND OF THE INVENTION

Polycarbonates represent a widely used class of materials which possess highly desirable physical properties relating to, for example, transparency, heat distortion resistance, toughness, and electrical resistance. These properties make the polycarbonates especially well suited for applications relating to, for example, molded products, extruded film, structural parts, tubing and piping, and prosthetic devices.

Polycarbonates generally encompass aliphatic and aromatic polycarbonates, with the aromatic polycarbonates being particularly desirable in commercial applications. Traditional methods for forming aliphatic polycarbonates have focused on the transesterification of diols with lower dialkyl carbonates, dioxolanones, or diphenyl carbonates in the presence of catalysts containing, for example, alkali metal, tin, and titanium compounds. Aliphatic polycarbonates have also been formed using zinc initiating species which copolymerize carbon dioxide and oxiranes.

Aromatic polycarbonates differ from aliphatic polycarbonates in that they typically possess a higher level of thermal stability. In general, these materials are synthesized by different methods. Typically, aromatic polycarbonates are prepared by reacting bisphenols with carbonic acid derivatives at high temperatures, e.g., by reacting a diphenol and a diphenyl carbonate. These reactions are usually carried out at low pressures (e.g., vacuum conditions) and high temperatures. Although these reactions may occur in the absence of organic solvents, the reactions are potentially disadvantageous in that complex apparatuses are often necessary, primarily due to the presence of a vacuum and the formation of a high viscosity of the melt polymer reaction product.

Solid state polymerization ("SSP") techniques are significant in that they are primarily used to chain extend low molecular weight polycarbonates to form higher molecular weight polymers. In order to carry out an SSP, it is often necessary to crystallize the polycarbonates. The polycarbonates are typically exposed to organic solvents such as methylene chloride, chlorobenzene, or chloroform to induce crystallization. The use of such organic solvents may be disadvantageous in that it raises certain potential environmental risks.

It is therefore an object of the present invention to provide processes of forming polycarbonates which do not require organic solvents and are not carried out under vacuum or low pressure conditions.

SUMMARY OF THE INVENTION

To the above end and others, the present invention provides processes for forming polycarbonates. In one aspect, the process of the invention comprises providing a reaction mixture of at least one polycarbonate-forming monomer and carbon dioxide, and then reacting the polycarbonate-forming monomer and the carbon dioxide in the reaction mixture to form the polycarbonate. The monomer is preferably selected from the group consisting of diphenyl carbonate, bisphenol-A, dimethyl carbonate, bisphenol-A diphenyl carbonate, and bisphenol-A, dimethyl carbonate, substituted bisphenol-A monomers, and mixtures thereof. Preferably, the polycarbonate is an aromatic polycarbonate selected from the group consisting of bisphenol-A polycarbonates.

In a second aspect, the invention relates to a process of forming a polycarbonate having increased molecular weight. Specifically, the process comprises providing a reaction mixture comprising at least one polycarbonate-forming oligomer and carbon dioxide, and then reacting the oligomer and the carbon dioxide to form a polycarbonate having a weight average molecular weight ranging from about 2,000 g/mol to about 500,000 g/mol.

In a third aspect, the invention relates to a process for forming crystalline polycarbonate. The process comprises providing a reaction mixture comprising uncrystallized polycarbonate and carbon dioxide, and then treating the uncrystallized polycarbonate with carbon dioxide to form the crystalline polycarbonate. The crystalline polycarbonate is preferably an aromatic polycarbonate present in a structure selected from the group consisting of granules, chips, thin films, and mixtures thereof. In this instance, the process may further comprise the step of extruding the aromatic polycarbonate manufactured or crystallized in $CO_2$ into an article of manufacture.

In a fourth aspect, the invention relates to a reaction mixture which comprises at least one monomer and carbon dioxide, wherein the monomer is capable of reacting with the carbon dioxide to form a polycarbonate.

BRIEF DESCRIPTION OF THE DRAWINGS

In the drawings which form a portion of the original disclosure of the invention.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In one aspect, the invention relates to a process of forming a polycarbonate. The process includes providing a reaction mixture having at least one polycarbonate-forming monomer and carbon dioxide. The polycarbonate-forming monomer and carbon dioxide then react in the reaction mixture to form a polycarbonate.

For the purposes of the invention, carbon dioxide is employed as a fluid in a liquid, gaseous, or supercritical phase. If liquid $CO_2$ is used, the temperature employed during the process is preferably below 31° C. If gaseous $CO_2$ is used, it is preferred that the phase be employed at high pressure. As used herein, the term "high pressure" generally refers to $CO_2$ having a pressure from about 20 to about 73 bar. In the preferred embodiment, the $CO_2$ is utilized in a "supercritical" phase. As used herein, "supercritical" means that a fluid medium is at a temperature that is sufficiently high that it cannot be liquified by pressure. The thermodynamic properties of $CO_2$ are reported in Hyatt, *J. Org. Chem.* 49: 5097–5101 (1984); therein, it is stated that the critical temperature of $CO_2$ is about 31° C.; thus the method of the present invention should be carried out at a temperature above 31° C.

The monomers which are employed in forming the polycarbonates according to the invention are varied and known in the art. Preferably, the monomers are chosen such that aromatic polycarbonates can be formed by melt transesterification. Exemplary monomers include, but are not limited to, diphenyl carbonate, bisphenol-A, dimethyl carbonate, bisphenol-A diphenyl carbonate, and bisphenol-A dimethyl carbonate. Substituted bisphenol-A monomers may be used such as, for example, those containing alkyl, phenyl, and halogen substituents. Mixtures of monomers may also be used.

For the purposes of the invention, the polycarbonate formed by the process of the invention has a conventional meaning which is known in the art. See e.g., H. Mark et al., *Encyclopedia of Polymer Science and Engineering*, Vol. 11, 2nd ed., (1985), 648-719. As an illustration, polycarbonates are polymers which contain recurring carbonate groups as integral parts of the main polymer chains. For example, this group includes linear homopolymers derived, whether actually or notionally, from the transesterification of bisphenol-A and diphenyl carbonate or dimethyl carbonate. Using bisphenol-A may yield AA/BB type polymers, wherein A represents alcohol groups and B represents carbonic acid derivative groups. Aromatic polycarbonates are preferably formed, although other polycarbonates are well within the scope of the invention. Exemplary aromatic polycarbonates include, but are not limited to, bisphenol-A based polycarbonates.

The process of the invention may include other components in the reaction mixture, the selection of which is known and appreciated by one skilled in the art. For example, the components may be added to control the chemical and physical properties of the polycarbonate products. Reagents can be added to limit the molecular weight of the polycarbonate product or to control the functionality of the polycarbonate. The reagents may also potentially shorten reaction times, decrease the flow of the supercritical extraction fluid, or facilitate end capping the polymer chain by employing a monofunctional monomer. Exemplary reagents include, but are not limited to, t-butyl phenol. Co-solvents may also be used in the reaction mixture, the selection of which are known by the skilled artisan.

In another aspect, the invention relates to a process for forming an aromatic polycarbonate with a weight average molecular weight ranging, on the lower end, from about 2,000 g/mol or about 5,000 g/mol to, on the higher end, about 100,000 g/mol or about 500,000 g/mol. The process includes providing at least one polycarbonate-forming oligomer, preferably an bisphenol-A based oligomer, and carbon dioxide, and then reacting the oligomer and carbon dioxide to form the polycarbonate having the above molecular weight range. Oligomers which are useful in such a process include, but are not limited to, those having a weight average molecular weight ranging from about 1,000 g/mol to about 20,000 g/mol.

In yet another aspect, the invention relates to a process for forming a crystalline polycarbonate. The process includes providing a reaction mixture comprising an uncrystallized polycarbonate and carbon dioxide. The uncrystallized polycarbonate is then treated with carbon dioxide to form the crystalline aromatic polycarbonate which is rendered useful for solid state polymerization. The crystalline polycarbonate is typically in the form of chips, granules, thin films, or mixtures thereof. Solid state polymerization preferably takes place at a temperature between the glass transition temperature and the melting point of the polycarbonate. Solid state polymerization typically utilizes an inert gas that is passed over the crystalline chips or granules to remove condensate vapors. Inert gases which are suitable in this operation include, but are not limited to, nitrogen, carbon dioxide, air, helium, ethane, propane, butane, and the like. Mixtures of these gases may also be used. The resulting polycarbonate preferably has a weight average molecular weight ranging from, on the lower end, about 5,000 g/mol or about 30,000 g/mol, to, on the higher end, about 100,000 g/mol or about 500,000 g/mol. The solid crystalline polycarbonate may then be extruded into an article of manufacture such as, for example, compact disks, head lamps, protective sheets, and windows, by using conventional techniques and processing conditions which are appreciated and known by the skilled artisan.

The processes of the invention may be carried out using known and appropriate equipment and techniques. For example, the processes may be carried out batchwise or continuously in a high pressure reaction vessel. The vessel may experience agitation by utilizing mixing means such as a paddle stirrer or impeller stirrers.

The reaction is typically carried out under temperature and pressure conditions such that the polycarbonates are formed via melt polycondensation. Preferably, the reaction is carried out at pressures at the low end of about 200 or about 500 psi ranging to, at a high end, of about 3000 psi or 5000 psi. In the event that a supercritical fluid is used, a pressure above the critical point of carbon dioxide should be used, namely 73 atm. The reaction is preferably carried out at temperatures ranging from, at a low end, of about −30° C. or −15° C., to, at a high end, of about 275° C. or about 500° C. Heating means may be employed to reach the desired temperatures such as, for example, an electric heating furnace or heating rods.

The reaction usually proceeds from between about 20 min and about 2,000 min. Additionally, during the reaction time, condensate evolves which contains the polycarbonate product. The condensate can be removed and collected from the reaction mixture in the vessel by manipulating the reaction conditions. Additionally, conditions can be employed such that residual monomer (e.g., phenol), which evolves during the reaction and is present in the reaction mixture, may be removed from the reaction vessel, usually under flow conditions, such that bisphenol-A polycarbonate is yielded. The phenol can be collected in a variety of ways known to the skilled artisan such as by, for example, a cold trap process, selective adsorption, dissolution, or any number of pressure and temperature schemes which may include, for example, a phase separation suitable for separating the condensate from the reaction mixture. The carbon dioxide can be recycled and the phenol can be reclaimed.

The processes of the invention are highly advantageous. For example, the use of high pressure carbon dioxide facilitates the removal of condensate from the melt phase condensation reaction which drives the polycarbonate to a high molecular weight. Additionally, the carbon dioxide lowers the viscosity of the polymer melt. The lower polymer melt viscosity is useful in facilitating chain ending reactions, in enhancing diffusion of the small molecular condensate through the polymer melt, and in enhancing the rate of polymer formation. Moreover, the lower viscosity lowers the energy required for mixing the system. The crystallization processes of the invention are desirable in that potentially hazardous organic solvents are not necessary to carry out such reactions.

The following examples are provided to illustrate the invention, and should not be construed as limiting thereof.

In the examples that follow, Bisphenol A ("BPA") was recrystallized in methanol/water having a 1:1 volume ratio, and dried under vacuum at 60° C. Diphenyl carbonate ("DPC") was recrystallized in methanol and dried under vacuum at room temperature. Tetraphenylphosphonium tetraphenylborate ("TPP-TPB") was prepared from tetraphenylphosphonium bromide and sodium tetraphenylborate.

EXAMPLE 1

Solubility Measurements of Monomers

The solubility of various monomers used in the synthesis polymerizations described in the Examples are set forth in Table 1 below. The solubilities were measured according to conventional techniques.

TABLE 1

| Compound | Temp (C.) | Pressure (bars) | Solubility | wt (g)/vol (mL) |
|---|---|---|---|---|
| BPA | 116 | 326 | N | 0.30% |
| DPC | 64 | 205 | Y | 5% |
| BPA diacetate | 53 | 146 | Y | 5% |
| dimethyl carbonate | 25 | 139 | Y | 5% |
| phenol | 25 | 63 | Y | 5% |
|  | 100 | 278 | Y | 3% |
| o-chlorophenol | 25 | 63 | Y | miscible throughout |

EXAMPLES 2–9

Examples 2–9 illustrate the syntheses of various polycarbonates in accordance with the invention.

EXAMPLE 2

An autoclave of 100 mL capacity equipped with an agitator was charged with 29.68 g (0.13 mol) of BPA, 27.99 g (0.131 mol: 1.005 eq/BPA) of DPC and 2 mg of TPP-TPB. After the reactor was heated up to 150° C. to melt the reagents, the agitator was set properly. Argon gas was introduced and flowed through the reactor slowly. After the reactor was heated up to 160° C. for 30 min, the temperature was raised to 270° C. gradually. The evolved phenol was collected using cold traps (dry ice of 2-propanol) by vacuum. Phenol (33.10 g) was extracted by the vacuum process. After 6 h of vacuum extraction, the reactor was cooled down. The product was dissolved in 50 mL of methylene chloride and the solution was poured into 600 mL of acetone to precipitate the resulting polymer. The precipitation was collected by filtration, washed with acetone, and then dried in vacuum at room temperature for 15 h. Polycarbonate molecular weights ranged to an optimum <Mw> of 24,000.

EXAMPLE 3

An autoclave of 100 mL capacity equipped with an agitator was charged with 29.68 g (0.13 mol) of BPA, 29.24 g (0.137 mol) of DPC and 2 mg of TPP-TPB. After the reactor was heated up to 150° C. to melt the reagents, the agitator was set properly. After the reactor was heated up to 180° C. for 60 min, the temperature was raised to 270° C. gradually and maintained for 1 h. The evolved phenol was collected using cold traps (dry ice of 2-propanol). Phenol (20.52 g) was extracted by the initial process. $CO_2$ was introduced to the reactor and the pressure of the $CO_2$ was raised to 4350 psi. A $CO_2$ outlet valve was opened such that $CO_2$ flowed through the reactor at a flow rate of 2 mL/min. The pressure was controlled between 4300 to 4400 psi using the outlet valve. After 4 h of the extraction with $CO_2$, the $CO_2$ was vented slowly and the reactor was cooled down. The product was dissolved in 50 mL of methylene chloride and the solution was poured into 600 mL of acetone to precipitate the resulting polymer. The precipitation was collected by filtration, washed with acetone, and then dried under vacuum at room temperature for 15 h. Polycarbonate molecular weights ranged to an optimum <Mw> of 3,000.

EXAMPLE 4

An autoclave of 100 mL capacity equipped with an agitator was charged with 29.68 g (0.13 mol) of BPA, 27.99 g (0.131 mol: 1.005 eq/BPA) of DPC and 2 mg of TPP-TPB. After the reactor was heated up to 150° C. to melt the reagents, the agitator was set properly. Argon gas was introduced and flowed through the reactor slowly. After the reactor was heated up to 160° C. for 10 min, the temperature was raised to 270° C. gradually and held for 1 h. The evolved phenol was collected using cold traps (dry ice of 2-propanol). Phenol (22.87 g) was extracted by the initial process using the continuous Argon flow. The $CO_2$ was introduced to the reactor and the pressure of the $CO_2$ was raised to 4350 psi. $CO_2$ outlet valve was opened a little to flow $CO_2$ with 2 mL/min flowing through the reactor. The pressure was controlled between 4300 to 4400 psi using the outlet valve. After 6 h of extraction with $CO_2$, the $CO_2$ was vented slowly and the reactor was cooled down. The reactor was opened at 150° C. and small pieces of the product were collected from the agitator. The rest of the product was dissolved in 50 mL of methylene chloride and the solution was poured into 600 mL of acetone to precipitate the resulting polymer. The precipitation was collected by filtration, washed with acetone, and then dried under vacuum at room temperature for 15 h. Polycarbonate molecular weights ranged to an optimum <Mw> of 13,000.

EXAMPLE 5

An autoclave of 100 mL capacity equipped with an agitator was charged with 34.24 g (0.15 mol) of BPA, 32.39 g (0.151 mol: 1.005 eq/BPA) of DPC and 2 mg to TPP-TPB. After the reactor was heated up to 150° C. to melt the reagents, the agitator was properly set. Argon gas was introduced and sent through the reactor slowly. After the reactor was heated up to 160° C. for 120 min, the temperature was raised to 220° C. gradually and held for 2 h. The temperature was further increased to 270° C. for 7 h. The evolved phenol was collected using cold traps (dry ice of 2-propanol). Phenol (17.87 g) was extracted by the initial process using the continuous Argon flow. $CO_2$ was introduced to the reactor and the pressure of the $CO_2$ was raised to 3100 psi. A $CO_2$ outlet valve was opened to allow $CO_2$ to flow through the reactor at a flow rate of 2–5 mL/min. The pressure was controlled between 3000 to 3300 psi using the outlet valve. After 7 h of extraction with $CO_2$, the $CO_2$ was vented slowly and the reactor was cooled down. The reactor was opened at 150° C. and small pieces of the product were collected from the agitator. The rest of the product was dissolved in 50 mL of methylene chloride and the solution was poured into 600 mL of acetone to precipitate the resulting polymer. The precipitation was collected by filtration, washed with acetone, and then dried under vacuum at room temperature for 15 h. Polycarbonate molecular weights ranged to an optimum <Mw> of 9,000.

EXAMPLE 6

An autoclave of 100 mL capacity equipped with an agitator was charged with 29.68 g (0.13 mol) of BPA, 27.99 g (0.131 mol: 1.005 eq/BPA) of DPC and 2 mg of TPP-TPB. After the reactor was heated up to 150° C. to melt the reagents, the agitator was set properly. Argon gas was introduced to the reactor and sent through the reactor slowly. After the reactor was heated up to 160° C. for 10 min, the temperature was raised to 270° C. gradually and held for 0.5 h. The evolved phenol was collected using cold traps (dry ice of 2-propanol). Phenol (22.87 g) was extracted by the initial process using the continuous Argon flow. $CO_2$ was introduced to the reactor and the pressure of the $CO_2$ was raised to 4350 psi. A $CO_2$ outlet valve was opened to allow $CO_2$ to flow through the reactor at a flow rate of 2 mL/min. The pressure was controlled between 4300 to 4400 psi using the outlet valve. After 6 h of extraction with $CO_2$, the $CO_2$ was vented slowly and the reactor was cooled down. The product was dissolved in 50 mL of methylene chloride and the solution was poured into 600 mL of acetone to precipitate the resulting polymer. The precipitation was collected by filtration, washed with acetone, and then dried in vacuum at room temperature for 15 h. Polycarbonate molecular weights ranged to an optimum <Mw> of 11,000.

EXAMPLE 7

Figure 1:
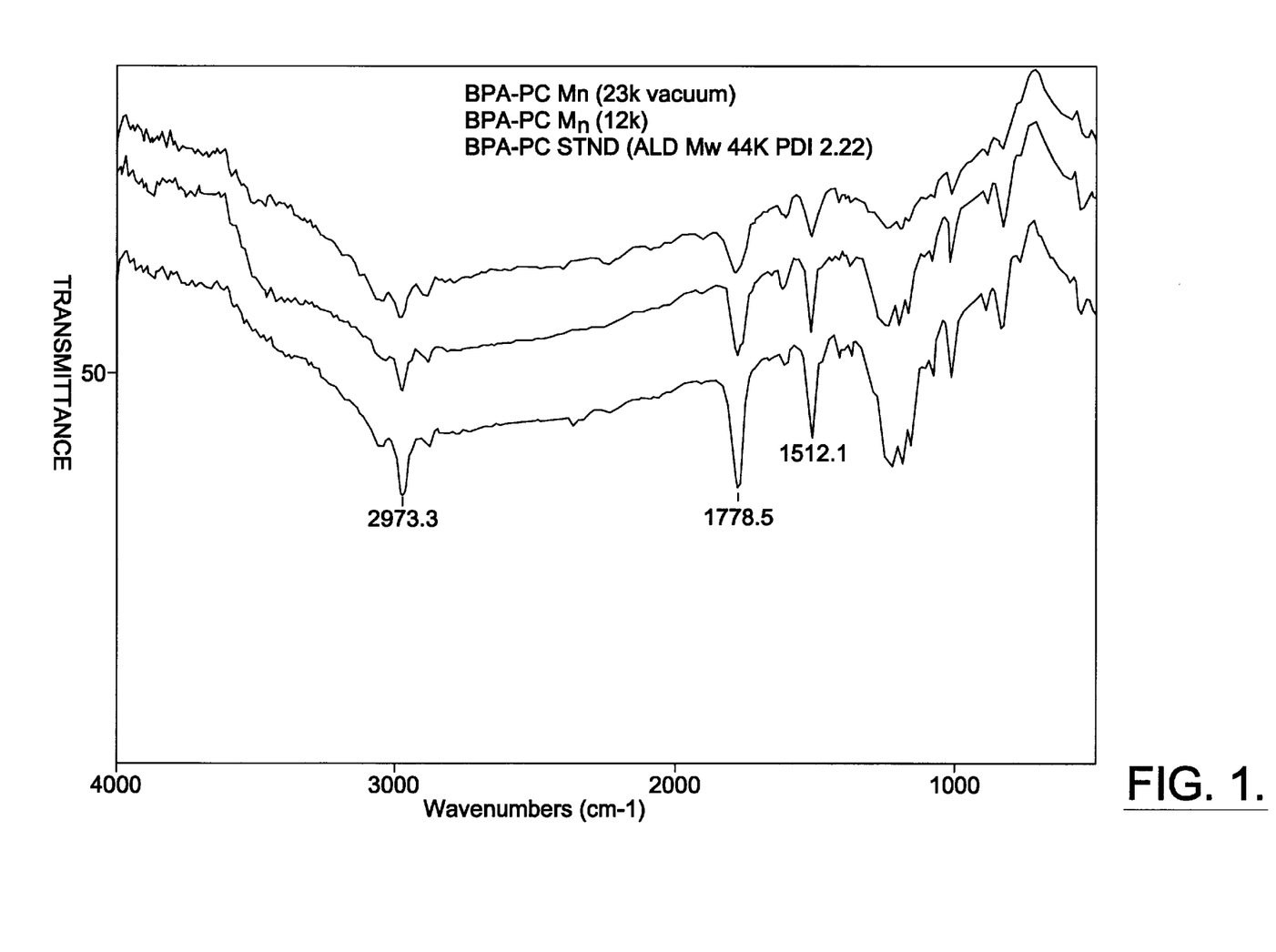
FIG. 1 illustrates an IR spectra of polycarbonate made in supercritical carbon dioxide.
Figure 2:
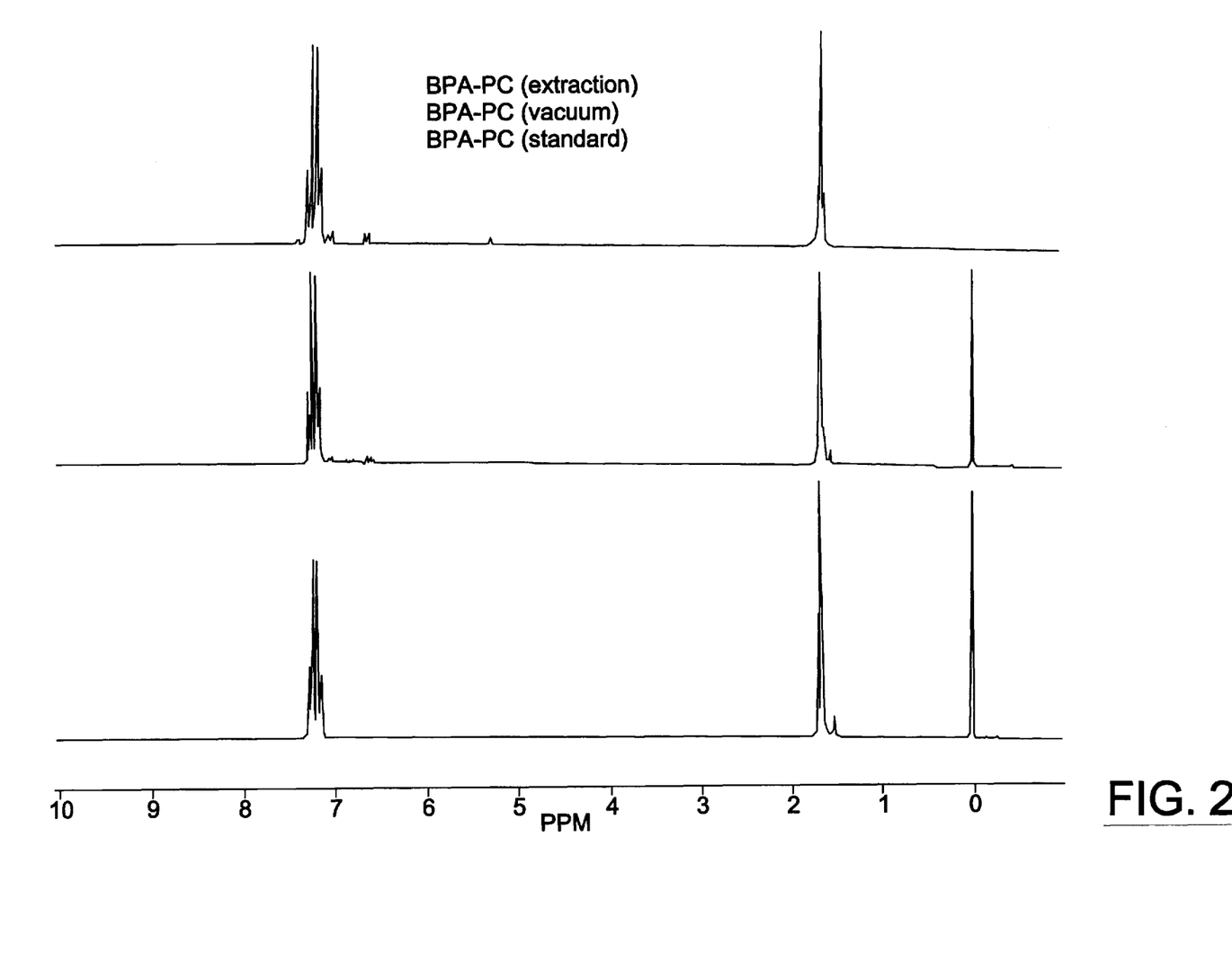
FIG. 2 illustrates an $^1$H NMR of polycarbonate made in supercritical carbon dioxide.
Figure 3A:
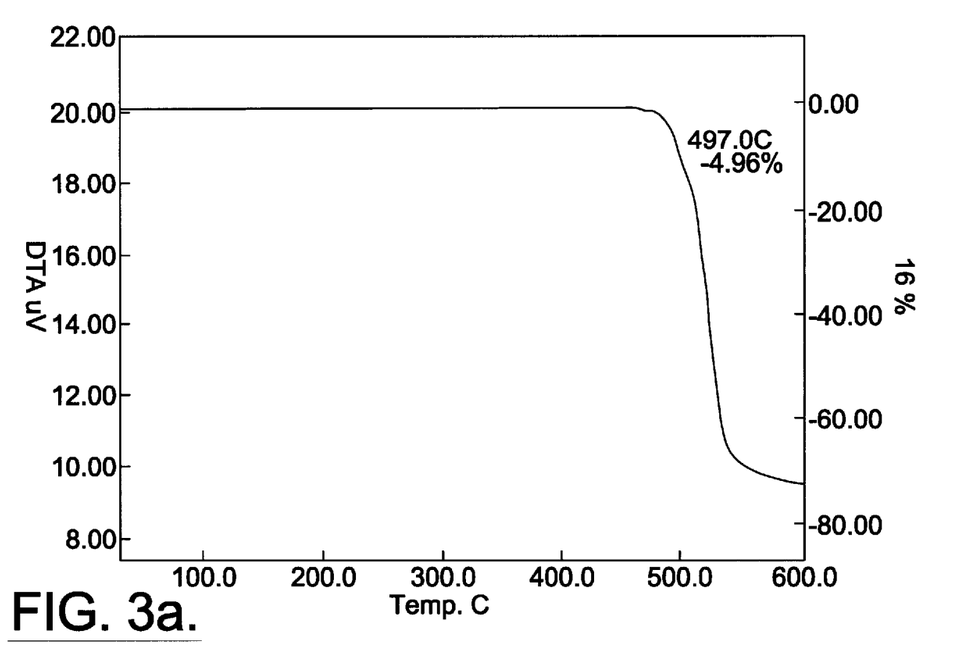
FIG. 3a illustrates a TGA of a commercial sample of polycarbonate.
Figure 3B:
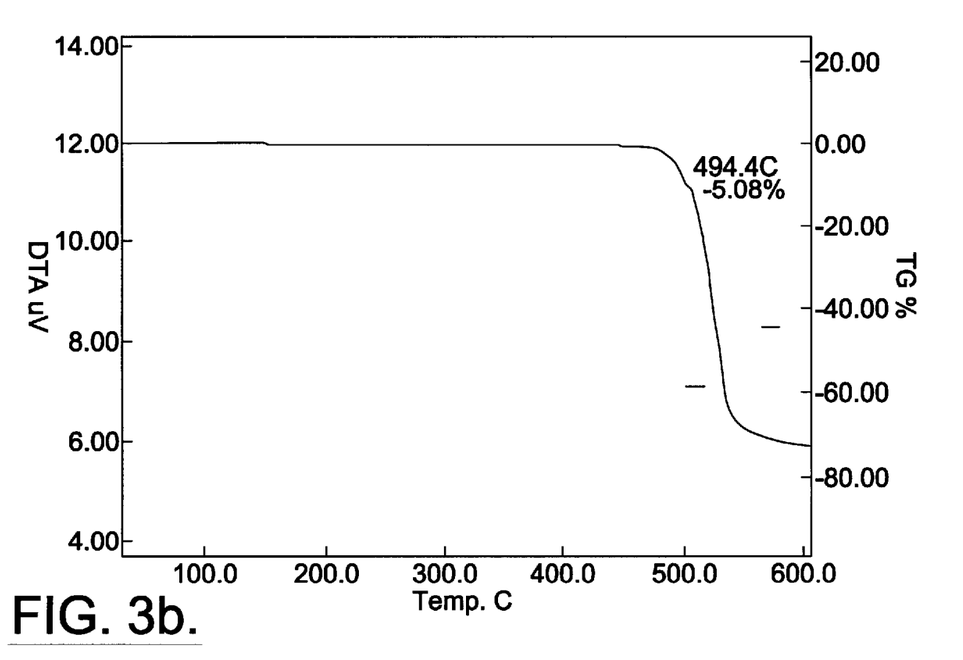
FIG. 3b illustrates a TGA of a carbon dioxide induced crystallized polycarbonate.
Figure 4A:
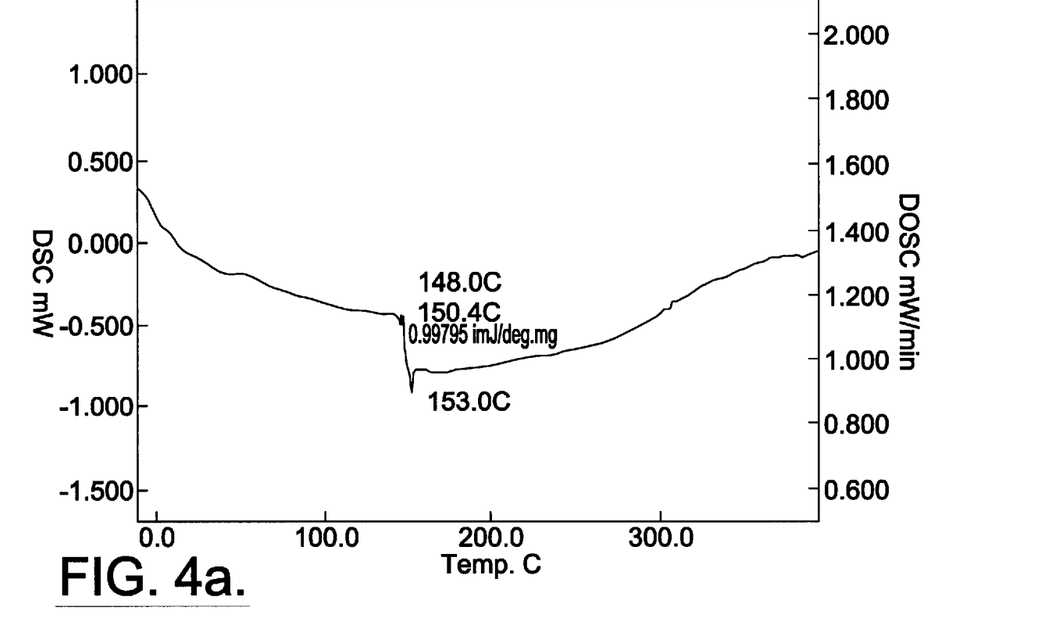
FIG. 4a illustrates a first heat DSC of a commercial sample of polycarbonate.
Figure 4B:
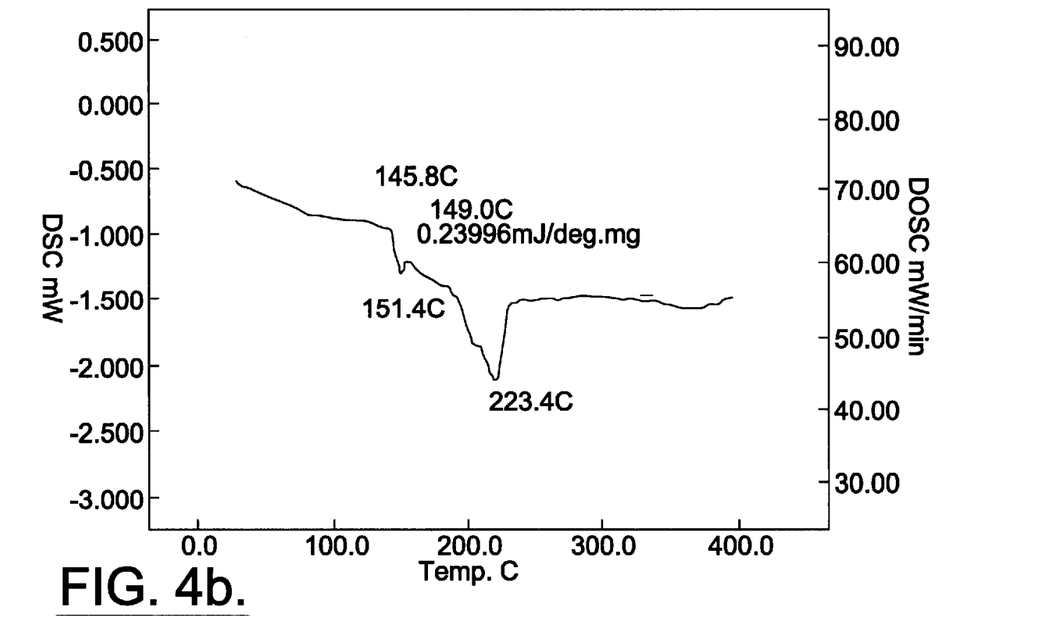
FIG. 4b illustrates a first heat DSC of a carbon dioxide induced crystallized polycarbonate.

0.51 grams of amorphous aromatic bisphenol-A based polycarbonate chips were treated with $CO_2$ for 4 hours at 150° C. and 3000 psi to induce crystallization. The starting amorphous polycarbonate chips were analyzed by TGA and DSC. The TGA showed a 5 percent weight loss at 495° C. and 497° C. for the crystalline polycarbonate and the amorphous polycarbonate respectively as illustrated in FIG. 3b. DSC analysis showed a glass transition temperature of 150° C. as illustrated in FIG. 4b. The aromatic polycarbonate crystallized with $CO_2$ was analyzed by DSC and was shown to have a crystalline melting transition point of 223° C.

EXAMPLE 8

Figure 5:
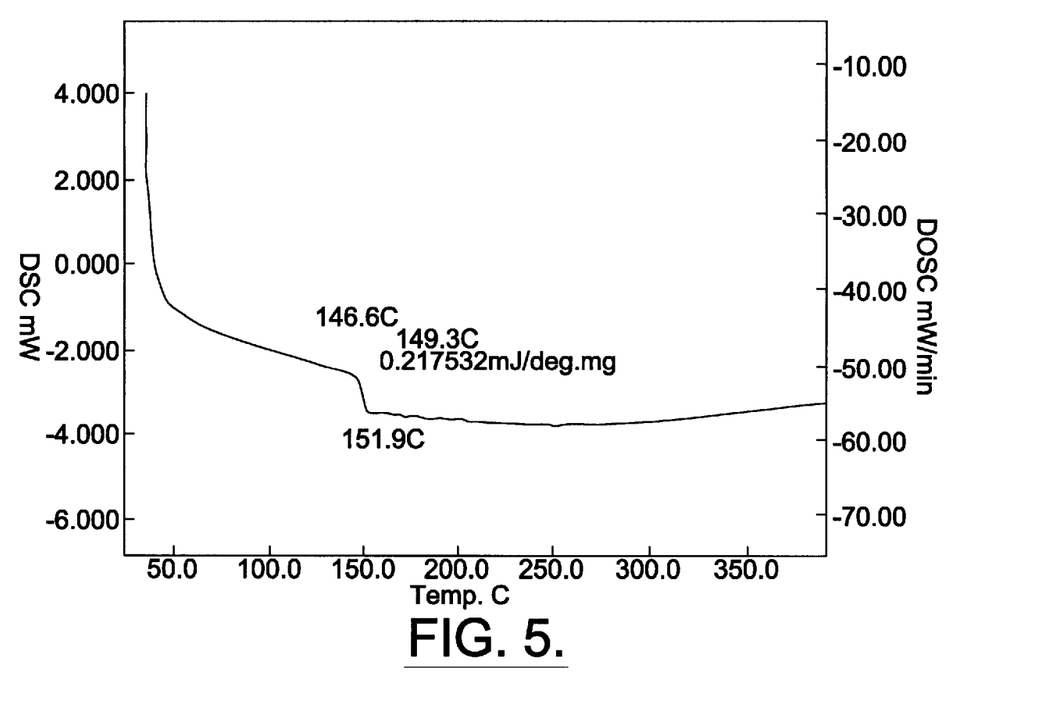
FIG. 5 represents a second heat DSC of a carbon dioxide induced crystallized polycarbonate.

Aromatic polycarbonate chips that were crystallized using $CO_2$ were melt treated above their melting point (223° C.) and cooled down to obtain amorphous aromatic polycarbonate. This was verified by running a DSC on the heat treated material which showed a glass transition of 149° C. and no melting transition as illustrated in FIG. 5.

EXAMPLE 9

Aromatic polycarbonate oligomers that were crystallized using $CO_2$ were loaded into a column. The column was heated to a temperature above the glass transition temperature of the sample of the oligomers but below the melting point of the sample. An inert gas was passed over the crystallized chips or granules to effect a solid state polymerization to raise the molecular weight of the sample.

In the specification, drawings, and examples, there have been disclosed typical preferred embodiments of the invention and, although specific terms are employed, they are used in a generic and descriptive sense only and not for purposes of limitation of the scope of the invention being set forth in the following claims.

That which is claimed is:

1. A process for forming crystalline polycarbonate granules suitable for solid state polymerization, said process comprising:

providing a mixture comprising uncrystalline polycarbonate granules and carbon dioxide; and treating said uncrystalline polycarbontate with carbon dioxide to form crystalline polycarbonate granules suitable for solid state polymerization, wherein said carbon dioxide is present in a state selected from the group consisting of gaseous high pressure, liquid, supercritical, and combinations thereof in said treating step, and wherein the gaseous high pressure state ranges from about 20 to 73 bar.

2. The process according to claim 1, wherein said crystalline polycarbonate is an aromatic polycarbonate selected from the group consisting of bisphenol-A polycarbonates.

3. The process according to claim 1, further comprising contacting said crystalline polycarbonate with an inert gas to form a polycarbonate having a weight average molecular weight ranging from about 5,000 g/mol to about 100,000 g/mol.

4. The process according to claim 3, wherein said inert gas is selected from the group consisting of nitrogen, carbon dioxide, helium, air, ethane, propane, butane, and mixtures thereof.

5. The process according to claim 3, further comprising the step of separating said polycarbonate having a weight average molecular weight ranging from about 5,000 g/mol to about 100,000 g/mol from said mixture.

6. A process for forming crystalline polycarbonate granules suitable for solid state polymerization, said process comprising:

providing a mixture comprising uncrystalline polycarbonate granules and carbon dioxide;

treating said uncrystalline polycarbontate with carbon dioxide to form crystalline polycarbonate granules suitable for solid state polymerization, wherein said carbon dioxide is present in a state selected from the group consisting of gaseous high pressure, liquid, supercritical, and combinations thereof in said treating step, and wherein the gaseous high pressure state ranges from about 20 to 73 bar; and contacting said crystalline polycarbonate with an inert gas to form a polycarbonate having a weight average molecular weight ranging from about 5,000 g/mol to about 100,000 g/mol.

7. The process according to claim 6, wherein the crystalline polycarbonate is present in a structure selected from the group consisting of granules, chips, and mixtures thereof.

8. The process according to claim 6, further comprising the step of separating said polycarbonate having a weight average molecular weight ranging from about 5,000 g/mol to about 100,000 g/mol from said mixture.

9. The process according to claim 6, wherein said crystalline polycarbonate is an aromatic polycarbonate selected from the group consisting of bisphenol-A polycarbonates.

10. The process according to claim 6, wherein said inert gas is selected from the group consisting of nitrogen, carbon dioxide, helium, air, ethane, propane, butane, and mixtures thereof.

11. The process according to claim 6, wherein said crystalline polycarbonate is an aromatic polycarbonate present in a structure selected from the group consisting of granules, chips, thin films, and mixtures thereof.

12. The process according to claim 11, said process further comprising the step of extruding said aromatic polycarbonate into an article of manufacture.

* * * * *

UNITED STATES PATENT AND TRADEMARK OFFICE
CERTIFICATE OF CORRECTION

PATENT NO. : 6,288,202 B1
DATED : September 11, 2001
INVENTOR(S) : DeSimone et al.

It is certified that error appears in the above-identified patent and that said Letters Patent is hereby corrected as shown below:

<u>Column 10,</u>
Line 12, please add the following claims:

-- 60. The process according to Claim 48, wherein the carbon dioxide is supercritical carbon dioxide.

61. The process according to Claim 48, wherein the carbon dioxide is liquid carbon dioxide.

62. The process according to Claim 48, wherein the carbon dioxide is gaseous high pressure carbon dioxide.

63. The process according to Claim 53, wherein the carbon dioxide is supercritical carbon dioxide.

64. The process according to Claim 53, wherein the carbon dioxide is liquid carbon dioxide.

65. The process according to Claim 53, wherein the carbon dioxide is gaseous high pressure carbon dioxide.

66. A process for forming crystalline polycarbonate suitable for solid state polymerization, said process comprising:
    providing a mixture comprising uncrystallized polycarbonate and carbon dioxide; and
    treating said uncrystallized polycarbonate with carbon dioxide to form crystalline polycarbonate granules suitable for solid state polymerization, wherein said carbon dioxide is present in a state selected from the group consisting of high pressure, liquid, supercritical, and combinations thereof in said treating step, and wherein the high pressure state ranges from about 20 to 73 bar.

67. The process according to Claim 66, wherein the crystalline

UNITED STATES PATENT AND TRADEMARK OFFICE
CERTIFICATE OF CORRECTION

PATENT NO. : 6,288,202 B1
DATED : September 11, 2001
INVENTOR(S) : DeSimone et al.

It is certified that error appears in the above-identified patent and that said Letters Patent is hereby corrected as shown below:

<u>Column 10 cont'd,</u> polycarbonate is present in a structure selected from the group consisting of granules, chips, and mixtures thereof.

68. The process according to Claim 66, wherein said crystalline polycarbonate is an aromatic polycarbonate selected from the group consisting of bisphenol-A polycarbonates.

69. The process according to Claim 66, wherein the carbon dioxide is supercritical carbon dioxide.

70. The process according to Claim 66, wherein the carbon dioxide is liquid carbon dioxide.

71. The process according to Claim 66, wherein the carbon dioxide is gaseous high pressure carbon dioxide.

72. The process according to Claim 53, wherein said inert gas is supercritical carbon dioxide.

Signed and Sealed this

Twenty-sixth Day of August, 2003

JAMES E. ROGAN
*Director of the United States Patent and Trademark Office*